April 29, 1930.  A. J. BOCZ  1,756,898
BALANCING DEVICE
Filed Aug. 16, 1926  3 Sheets-Sheet 1
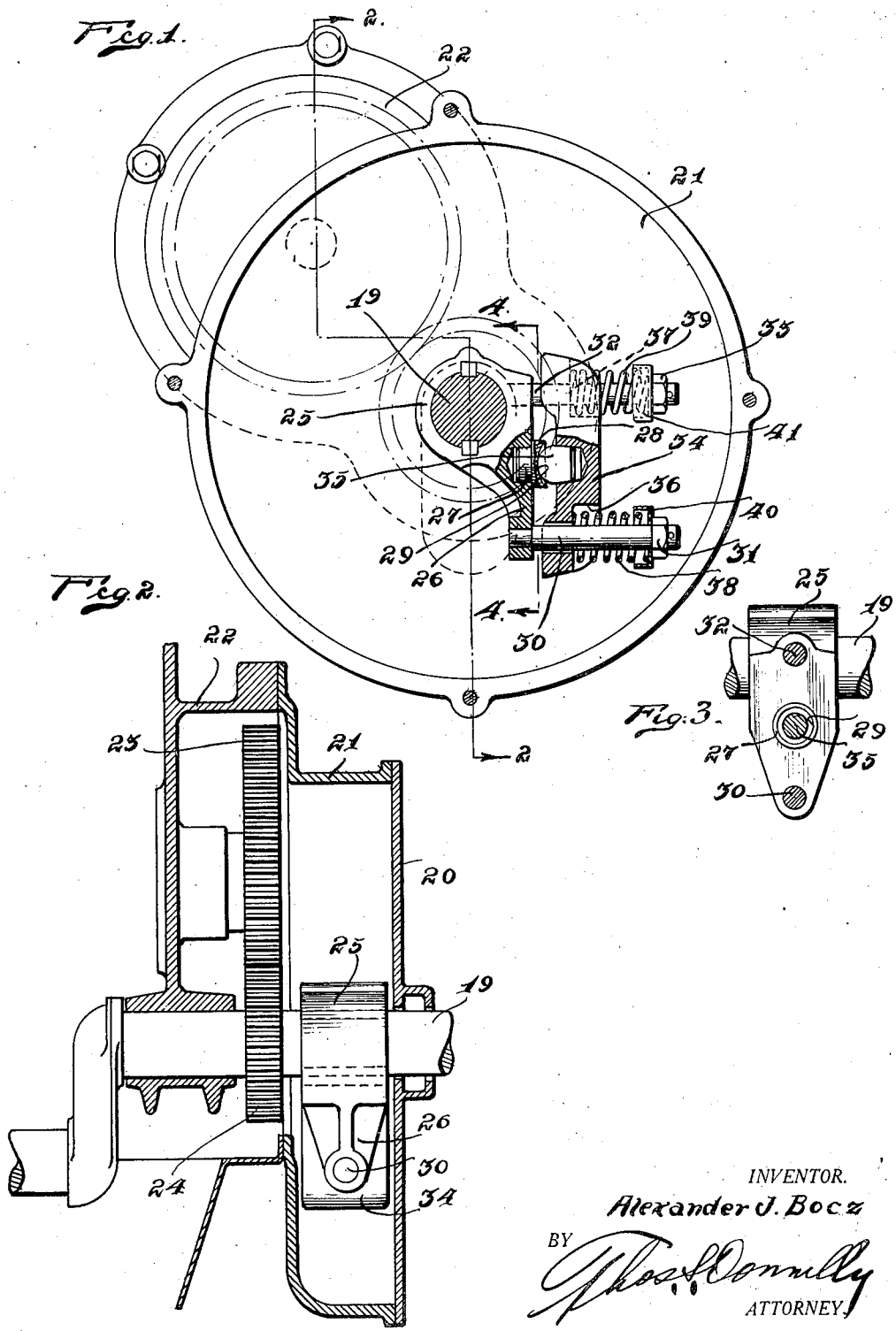
INVENTOR.
Alexander J. Bocz
BY
ATTORNEY.

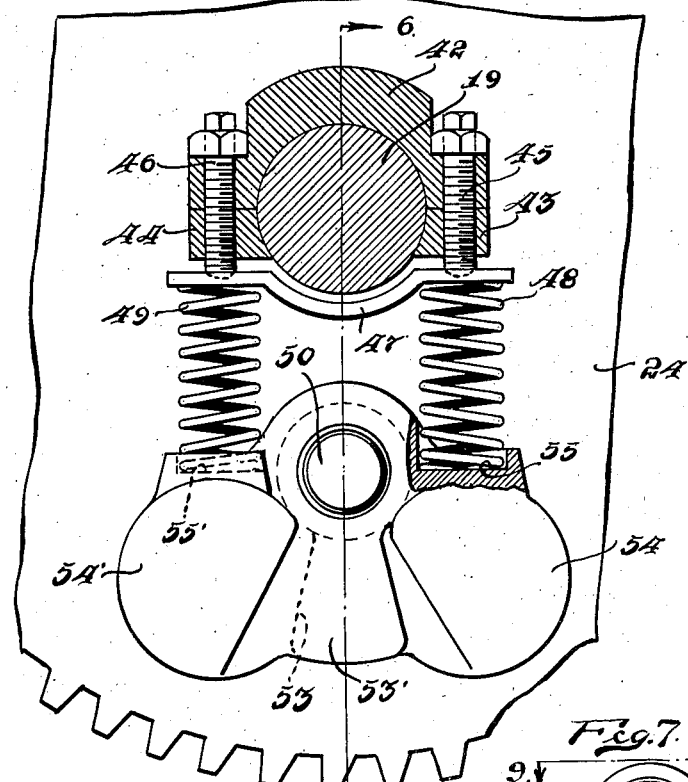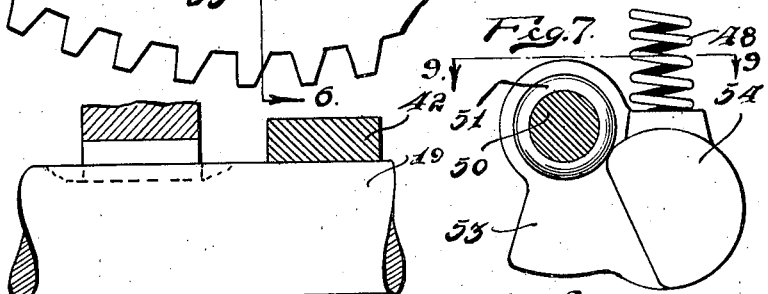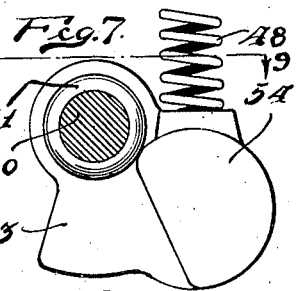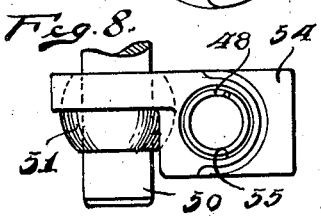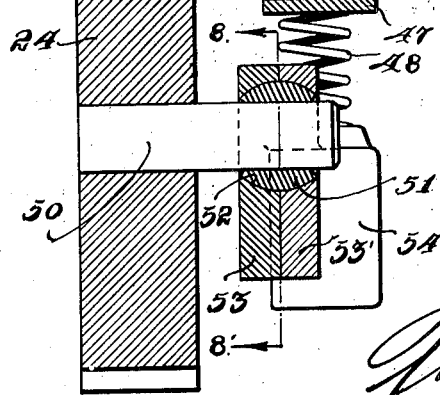

April 29, 1930.    A. J. BOCZ    1,756,898
BALANCING DEVICE
Filed Aug. 16, 1926    3 Sheets-Sheet 3
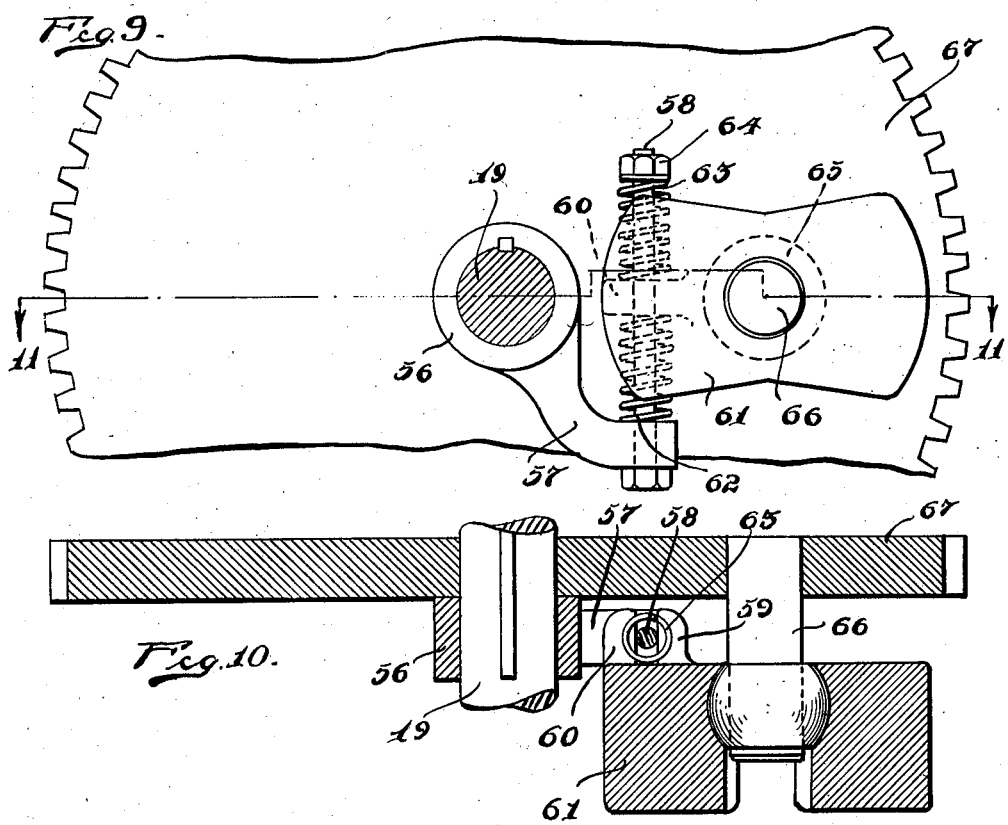
INVENTOR.
Alexander J. Bocz
BY
ATTORNEY.

Patented Apr. 29, 1930

1,756,898

UNITED STATES PATENT OFFICE

ALEXANDER J. BOCZ, OF DETROIT, MICHIGAN

BALANCING DEVICE

REISSUED

Application filed August 16, 1926. Serial No. 129,379.

My invention relates to a new and useful balancer for engines, particularly engines of a type in which reciprocating and rotating parts are associated together for the deliverance of power, such as internal combustion engines and piston operated engines and such other types, the operation of which effects a setting up of vibration or unbalanced forces. In the operation of an engine, the vibration at certain high speeds is more pronounced, although vibrations are always present during operation, and the present invention is to overcome any vibrations in engines etc.

The fact that vibration is more pronounced at certain engine speeds makes it appear that the cause of the phenomenon lies in synchronism at the high speeds between vibration producing impulses and the natural rate of vibration of the crank shaft. These vibrations are due to the flexibility of the crank shaft. All crank shaft steels have a certain degree of elasticity and consequently the crank is subject to elastic deformations or angular deflections under the application of torque. Since the torque of an internal combustion engine is variable it follows that the amount of angular deflection accordingly varies upon transmission of this torque to the crank shaft, thus causing the crank shaft to have torsional oscillations or torsional vibrations.

When the frequency of the torsional oscillations or vibrations are in accord with the natural vibration period of the crank shaft, the deflections are greatly increased and the result is increased vibration. The rear end of the crankshaft, in the ordinary construction of an engine, is retained from rapid acceleration, due to the inertia of its flywheel.
Hence when the torsional moment is exerted on, for instance—the most forward crank pin—is suddenly increased, as by an explosion in the forward cylinder, the crank shaft will twist slightly, and a moment later, as the torsional movement on the crank pin decreases, the crank shaft will unwind owing to its torsional elasticity. Thereafter, the torsional force of some other crank pin will increase and cause the crank shaft to wind up again.
In this torsional vibration there is also effected an axial movement of the crank shaft as well as a deflection of the crank shaft from its normal axial position. In four cylinder engines there is slight torsional vibration because of the shortness of the crank shaft, therefore all shafts have torsional vibration.

The present invention is particularly, as mentioned, adapted for any type of engine.

In a six cylinder engine or an engine made up of a multiple of six cylinders the primary, secondary and fourth unbalanced forces are balanced but there arises a sixth unbalanced force as well as the torsional unbalanced forces.

In an eight cylinder engine, or an engine made up of a multiple of eight cylinders, the primary and secondary forces are balanced, the fourth force and the torsional vibration being unbalanced.

The present invention has as its object the provision of a device which will serve to balance the unbalanced forces in those engines having less than six cylinders.

The present invention has also as its object the provision of a balancer in which a counterbalancing effect is brought about through a radial operation of counterbalancing forces, and the provision of a device in which axial operation of counterbalancing forces is effected for overcoming the unbalanced forces of the engine, machines, vitaphones, etc.

Another object of the invention is the provision of a device, whereby the unbalanced forces are brought into conflict with the inertia of the counterbalancing mechanism, the conflict between the unbalanced forces and the inertia of the counterbalancing mechanism effecting the desired balancing of the engine, machines, vitaphones, etc.

Other objects will appear hereinafter.

The invention consists in the combination and arrangement of parts hereinafter described and claimed.

The invention will be best understood by a reference to the accompanying drawings which form a part of this specification and in which, Fig. 1 is a front elevational view of a part of an engine showing the invention applied with parts in section and parts broken away.

Fig. 2 is a fragmentary sectional view taken on substantially line 2—2 of Fig. 1.

Fig. 3 is a fragmentary sectional view taken on substantially line 4—4 of Fig. 1.

Fig. 4 is a front elevational view of a modified form of the invention showing it mounted on a shaft shown in section.

Fig. 5 is a fragmentary sectional view taken on substantially line 6—6 of Fig. 4.

Fig. 6 is a perspective view of a ball used in the invention.

Fig. 7 is a fragmentary sectional view taken on substantially line 8—8 of Fig. 5.

Fig. 8 is a fragmentary view taken on substantially line 9—9 of Fig. 7.

Fig. 9 is a front elevational view of a further modified form of the invention showing it applied to a shaft shown in fragment.

Fig. 10 is a fragmentary sectional view taken on substantially line 11—11 of Fig. 9.

In the embodiment of my invention shown in Figs. 1, 2 and 3, a crank shaft 19 projects through the front wall 20 of a housing 21 which is positioned forwardly of the timing gear housing 22, the usual timing gears 23 and 24 being shown. Fixedly mounted upon the crank shaft 19 to rotate therewith is a collar 25 on one side of which is an arm 26, the collar and arm serving to form a bracket or carrying member rotatable with the crank shaft. Fixedly mounted in the bracket is a plug 27 having a head 28 in which is formed a concave depression or pocket 29. Projecting outwardly from adjacent the end of the arm 26 is a stud 30 which is threaded for the reception of a suitable nut 31. A similar stud 32 projects outwardly from the bracket at the opposite end, this stud 32 being also threaded for a nut 33. A counterbalancing weight is used in this invention embodying the member 34, which may be termed a rockable beam, being provided with enlarged openings through which the studs 32 and 30 project so that there is play between the beam 34 and the studs 30 and 32. Projecting outwardly from one side of the beam 34 is a substantially spherical contact member 35, preferably positioned at the transverse medial line of the beam 34. Recesses 36 and 37 are formed in the opposite ends of the beam 34 and engaging these recesses are the ends of springs 38 and 39 respectively, the opposite ends engaging washers 40 and 41 respectively, to prevent the natural vibration of the springs, which are retained in position by means of the nuts 31 and 33. It is evident that turning the nuts 31 and 33 will change the effective pressure of the springs 38 and 39, so that the amount of force necessary to rock the beam 34 on its contact point 35 as a pivot may be varied. The structure is such that the beam 34 may be rocked on its contact point 35 as a pivot against the force of either of the springs 38 and 39, a rocking in one direction longitudinally of the beam 34 effecting an additional compression of the spring 38 and a rocking of the beam in the other direction longitudinally effecting an additional compression of the spring 39. The beam 34 may also be rocked transversely on its contact point 35 as a pivot, in this instant additional pressure being exerted upon the beam by each of the springs 38 and 39 under normal conditions.

In operation the beam 34 rotates with the crank shaft 19 and it will be noted that one end of the beam 34 is positioned a greater distance from the center of rotation than the other end so that in rotating, the beam 34 will be slightly tilted on its contact point 35. As the various unbalanced forces are transmitted through the crank shaft they will be transmitted also to the springs 39 and 38 and thus to the beam 34, so that a rocking of this beam, in response to the force transmitted by the unbalanced forces, will be effected, this rocking being longitudinally of the beam 34 on its contact points 35, and being resisted by the springs 38 and 39, this rocking will effect the desired balancing.

When the crank shaft 19 rotates the beam 34 will be rotated in a plane at right angles to the axis of the crank shaft 19, and the beam 34 through inertia will tend to remain in this plane. The torsional vibration will tend to move the beam 34 out of its plane of rotation and the resistance of the beam to removal will overcome the torsional vibration, thus effecting the desired balance, the springs 38 and 39 also functioning in this operation.

In the form shown in Fig. 4 the balancing is effected through calling into play the same forces that are called into play in the form shown in Fig. 1. Mounted on the shaft 19 is a collar 42, which is connected to the blocks 43 and 44 by means of the screws 45 and 46, these screws serving to bind the collar on the shaft 19 so that it may rotate therewith. An engagement beam 47, which is formed arcuate intermediate its ends, is adapted to engage the ends of the screws 45 and 46. The coil springs 48 and 49 engage the ends of the engagement beam 47.

As shown in Fig. 5 the shaft 19 is projected through the gear 24ª. Projecting outwardly from the outer face of the gear 24ª and fixedly mounted therein, is a stud 50. Mounted upon the stud 50 is a locking ring 51 which engages in an opening 52 formed in a weight comprising the reduced portion 53 and the thicker portion 54. A pocket 55 is formed in the portion 54 and engaging in this pocket is the outer end of the spring 48. A similar weight, having the portion 54' and the reduced portion 53' is mounted on the locking ring, the reduced portion 53 overlapping with the reduced portion 53' as clearly appears in Fig. 4. A pocket 55' is formed in the portion 54' for the reception of the outer end of the spring 49. These weight members are so mounted on the locking ring 51 that a universal movement is possible against the tension of the springs 48 and 49. When the shaft 19 is in rotation, vibrations or unbalanced forces will be counterbalanced through the swinging movement of these weights on the locking ring 51 as a pivot against the tension of the springs 48 and 49. It is evident that the weights may also be rocked transversely of the plane in which they will ordinarily be rotating so that the tendency to displace the weights out of their plane of rotation will be resisted by the inertia of the rotating bodies, and this resistance will effect a counterbalancing or overcoming of the torsional vibration.

In Fig. 9 and Fig. 10, I have shown a further modified form of the invention in which there is mounted fixedly upon the shaft 19 a ring 56, projecting outwardly from which is an arm 57 which forms a bracket through which extends the bolt 58 which projects between a pair of lugs 59 and 60, extending inwardly from one side of a weight 61, mounted on the bolt 58 at one side of the lugs 59 and 60 is a coiled spring 62, a coil spring 63 being mounted on the bolt at the other side of the lugs, the pressure of these springs against the lugs 59 and 60, being determined by the nut 64 which is on the bolt 58. The weight 61 is mounted on a spherical locking ring 65 so as to have universal movement thereon, this rocking ring being positioned on a stud 66 which projects outwardly from one face of the gear 67. As the shaft 19 is rotated, the arm 57 will rotate in unison therewith as will also the gear 67, carrying with it the weight 61. As the impulses or unbalanced forces are transmitted to the weight, the weight 61 will rock on its pivot against the tension of the springs 63 and 62, the direction of this rocking being dependent upon the direction in which the forces are transmitted and the nature of the unbalanced forces which are being counterbalanced.

With the various forms illustrated the advantages and features of the invention are believed shown in a manner practically adaptable to engines of various types and a practical and simple method is illustrated for overcoming the unbalanced harmonic forces and the torsional vibrations and such other unbalanced forces as may exist in any engine, also machines, vitaphones, etc., where it is desirable to reduce vibrations.

It is understood the balancing members must be balanced static and running when assembled with the rotating part.

My device takes care simultaneously or otherwise of all unbalanced forces tending to cause vibration at any time, because it has universal action, and is for this reason new.

While I have illustrated and described the preferred form of structure, I do not wish to limit myself to the precise form of structure shown, but desire to avail myself of such variations and modifications as may come within the scope of the appended claims.

Having thus described my invention what I claim as new and desire to secure by Letters Patent is:

1. An engine balancer of the class described adapted for the use with an engine having a rotatable part comprising: a carrying member rotatable by said part; a balancing member carried by said carrying member and rockable universally as to direction in response to force transmitted thereto; and yieldable means for normally resisting rocking movement of said member.

2. A balancer attached to a rotating part to be balanced comprising a revolving member rockable universally, and yieldable means limiting the rocking of said member.

3. A balancer for engines of the class described adapted for use with an engine having a rotating part comprising a balancing member rotatable by said rotating part, said balancing member being movable on its mounting universally as to direction and adapted for movement in response to force exerted upon the same by the unbalanced forces of said engine; and spring means for resisting movement of said member.

4. A balancer for engines of the class described adapted for use with an engine having a rotating part comprising: a balancing member rotatable by said rotating part, said member being displaceable relatively to its mounting universally in response to any forces exerted upon the same by the unbalanced forces of said engine, and yieldable means for resisting displacement of said balancing member, said yieldable means and said balancing member co-operating for counterbalancing the unbalanced forces of said engine.

5. In a balancing device for internal combustion engine the combination of a carrying member mounted on a rotating part of said engine, a balancing member universally mounted on one side of the center of said rotating part and adapted to be carried around the axis thereof, and resilient means to hold said balancing member in its plane of revolution.

6. In a balancing device for internal combustion engine, the combination of a carrying member secured to a rotating part of the engine, a balancing member pivoted for movement in all directions on said carrying member, and at one side of the axis of said carrying member, and resilient means to hold said balancing member in its plane of revolution.

7. A balancing device of the class described adapted for use with an engine having a rotating part comprising: a carrying member mounted on said part and rotatable therewith; a rockable balancing member carried by said carrying member and rockable transversely and longitudinally in response to force directed against the same; and yieldable means limiting rocking of said balancing member in its plane of revolution.

8. A balancer of the class described adapted for use with a rotatable part comprising a carrying member rotatable by said part; a balancing member carried by said carrying member and rockable universally as to direction in response to force transmitted thereto; and resilient means to resist rocking of said balancing member in all directions in its plane of revolution.

In testimony whereof I have signed the foregoing.

ALEXANDER J. BOCZ.